X0007401
I. Doolittle.
Cloth Finishing Mach.
Patented Feb. 1, 1833.
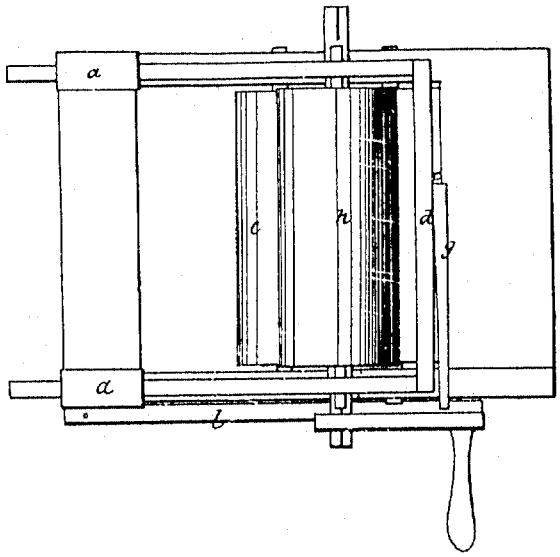
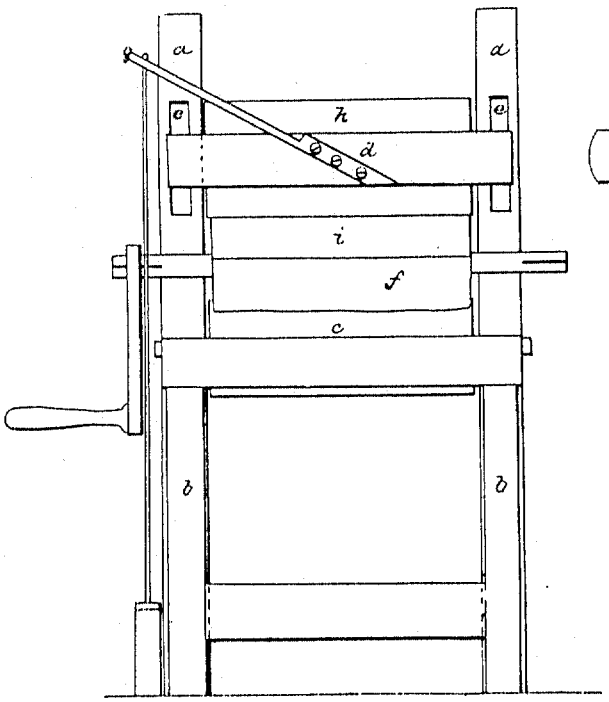
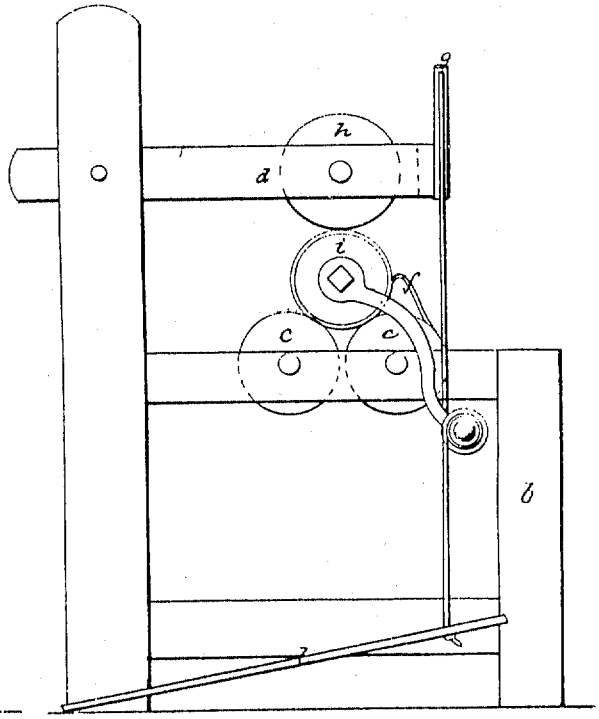
N. PETERS, PHOTO-LITHOGRAPHER, WASHINGTON, D.C.

Feb. 1. 1833

Isaac Doolittle, Bennington Vermont

Letters Patent

The Schedule referred to in these Letters Patent and making
part of the same, containing a description in the words of the said
Isaac Doolittle himself of his improvement in the Machine called the
American Mangle, or Domestic Calender.

To all persons to whom these presents shall come.
Isaac Doolittle of Bennington, in the County of Bennington & State of
Vermont sends Greeting. Be it known that I the said Isaac Doolittle
have invented, constructed, made & applied to use, a new & useful Ma-
chine called the American Mangle, or domestic Calender, specifi-
ed in the words following, viz. This Machine consists in a square or
an oblong frame of any convenient height, composed of four posts
connected two & two by two transverse bars or girths; the two front posts are
longer & extended higher than those in the rear; on this frame & near
the front posts, rest two cylinders, at a small distance apart their
axis being parallel to each other, & in the same horizontal plane,
& having ~~their~~ gudgeons imbedded in the frame. In a movable
frame the ends of which are introduced into two mortises in
the upper part of the front posts while the other extremity is
left to describe an arc of a circle, in the vertical plane about the
pins, which retain them in the mortises as centers & at such distance
from the fulcrums, as to bring its axis when the movable frame is hori-
zontal directly over the middle of the space which separates the two
cylinders above named, is placed the axis of a third cylinder parallel
to the two first. A fourth cylinder the axis of which extends far e-
nough each way to receive a crank, & to admit of its being turned
without touching the frame, is placed parallel to the other cylin-
ders, & resting on the two first; this fourth cylinder is covered with
cloth, one end of which hangs loose a few inches more or less from

7481X from the cylinder; on this cloth developed, & resting on one of the lower cylinders; is placed the end of the article to be smoothed, folded to the proper width; by turning the crank in the proper direction the article is wrapped around the fourth cylinder; when a sufficient quantity for one operation, is thus wound on the cylinder in the moveable frame is lowered to come in contact with it and a proper degree of pressure applied by means of a rod which connects the extremity of the moveable frame, with a pedal on which is placed the foot of the operator. Things thus prepared, the crank cylinder is turned for a short time, in the same direction as for winding on the linen. The friction of this cylinder causes the others to revolve in the contrary direction, and the pressure is such, as soon not only to smooth the clothes submitted to the operation, but to give them a beautiful lustre. Linen to be smoothed by this machine, should be moistened much less, than for smoothing by the common sad iron I have forborne to give dimensions because these may be varied at pleasure without altering the principle of the machine; the same may also be said of the materials of which it is constructed.

I do not claim as new any single or detached part of this machine but I do claim as new the application of this combination of parts to the above use. In testimony that the above is a true specification of my said machine as above described I have hereunto set my hand this 6th day of March, in the year of our Lord one thousand eight hundred and thirty two.

S. Doolittle

[illegible] Witnesses
[illegible] Pierpont Isham
Wm Bigelow

I636 [illegible]